Figure 1:
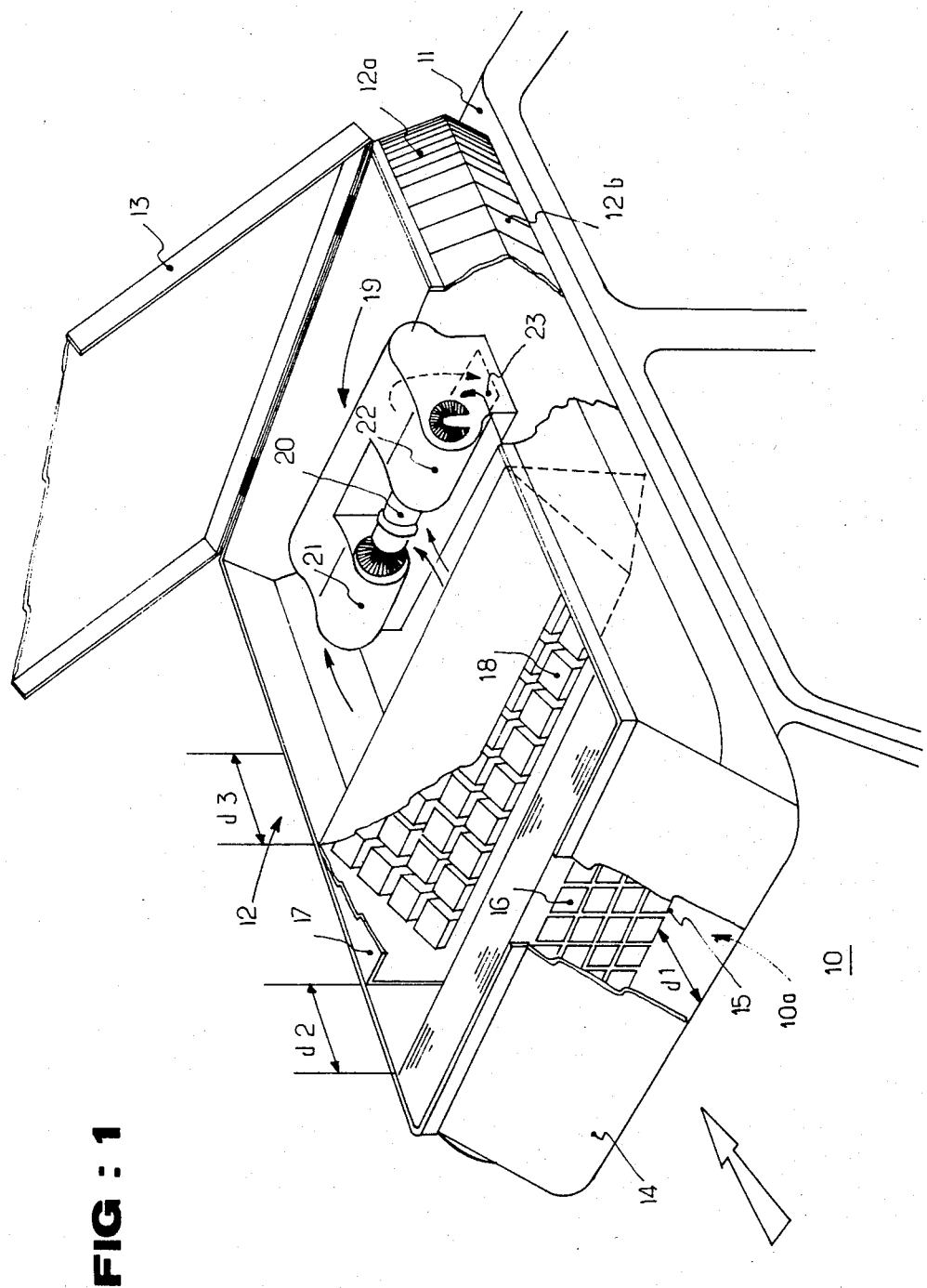

United States Patent [19]

Mattei

[11] Patent Number: 4,492,151
[45] Date of Patent: Jan. 8, 1985

[54] AIR PRESSURIZERS/CONDITIONERS ESPECIALLY FOR WORK CABS IN A POLLUTED ATMOSPHERE

[76] Inventor: Eliane Mattei, 11 bij rue Chevalier, 94210 Lavarenne St. Hilaine, France

[21] Appl. No.: 471,826

[22] Filed: Mar. 3, 1983

[30] Foreign Application Priority Data

Mar. 5, 1982 [FR] France .................. 82 03663

[51] Int. Cl.$^3$ .............................................. B60H 3/00
[52] U.S. Cl. ....................................... 98/2.11; 98/1.5; 55/274; 236/94
[58] Field of Search ................... 98/1.5, 2.11; 236/94; 155/DIG. 34, 274

[56] References Cited

U.S. PATENT DOCUMENTS

| 2,267,824 | 12/1941 | Griffith | 98/18 |
|---|---|---|---|
| 3,657,992 | 4/1972 | Minnick, Jr. | 98/2.11 |
| 3,726,104 | 4/1973 | Howland | 55/274 |
| 3,766,844 | 10/1973 | Donnelly et al. | 98/1.5 X |
| 3,771,365 | 11/1973 | Schempp | 55/274 X |
| 3,868,896 | 3/1975 | Doll et al. | 98/2.11 |
| 4,120,527 | 10/1978 | Lawrence | 98/2.11 X |

Primary Examiner—William E. Wayner
Attorney, Agent, or Firm—Robert Scobey

[57] ABSTRACT

The operative within a work cab is protected from a polluted atmosphere by provision on the cab of an air pressurizer/conditioner which comprises an air treatment unit and a turbo-fan assembly. The air treatment unit (12) takes the general form of a parallelepipedic box having on one of its front faces a suction orifice 10a extending over the greater part of this face to allow access to the front face of the coarse filter element (15) and to the front face of the fine filter element (16), these said faces being attached mechanically and without a leak to an intermediate leak-proof frame. The turbo-fan assembly (19) is located inside the box downstream of the filter elements (15, 16 and 17) so that the air passes through the said filter elements as a result of suction and is delivered purified into the working cab (11) through a diffuser (24). A pressurizer is provided with a pressurization monitoring device and a toxicity detector (32) for the air forced into the cab.

6 Claims, 5 Drawing Figures

FIG: 1

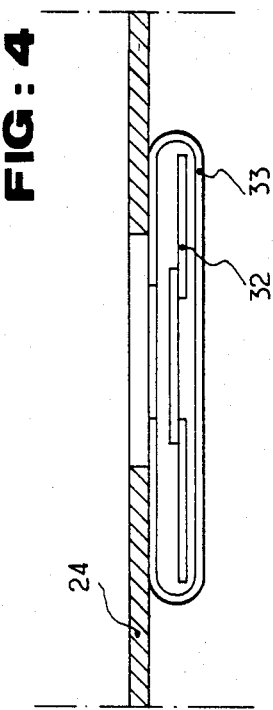
FIG: 4
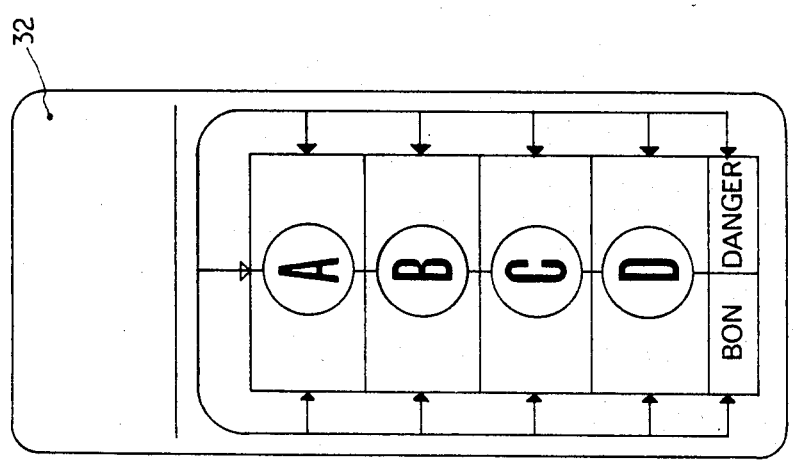
FIG: 3

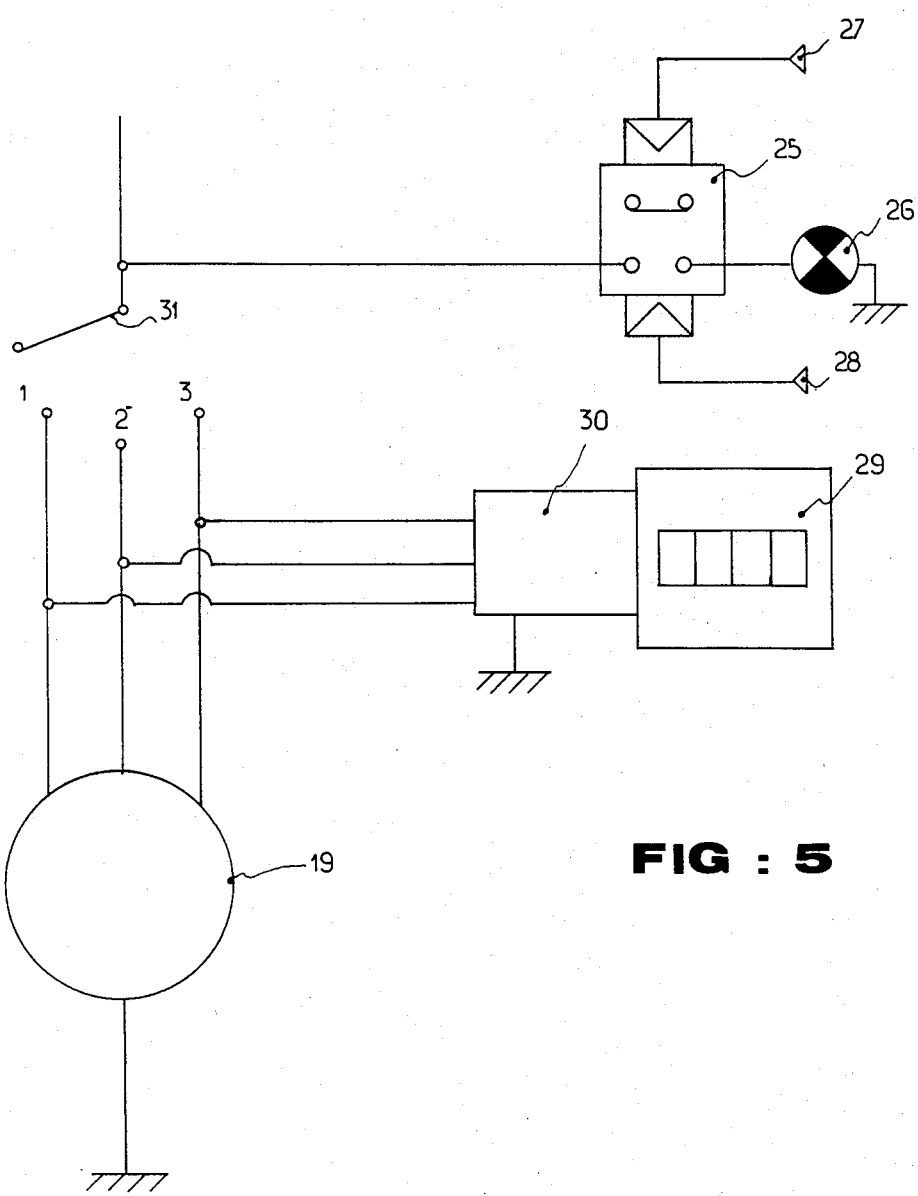
FIG : 5

AIR PRESSURIZERS/CONDITIONERS ESPECIALLY FOR WORK CABS IN A POLLUTED ATMOSPHERE

The invention relates to an air pressuriser/conditioner, especially for work cabs in a polluted atmosphere.

The invention relates more particularly to the indispensible protection of persons against solid, liquid or gaseous products which are encountered in agricultural work, especially products for treating the soil or crops.

Before discussing the main arrangements of the invention, it is appropriate to recall the difficulties met with during the use of filter equipment which can be designed for or built into work cabs in a polluted atmosphere. The state of the art is provided by certain types of equipment which are most often designed for attachment to the roof of a vehicle cab, for example the roof of an agricultural tractor cab.

Such equipment has hitherto consisted of an enclosure possessing, outside the cab, an air inflow for feeding a motor-driven fan which forces air into the enclosure so as to make it pass through a dust filter and then, in some installations, an activated-charcoal filter for absorbing harmful gases, after which the filtered air is conveyed into the cab of the vehicle.

In this type of equipment, the motor-driven fan is located on one of the outer walls of the enclosure and sucks the outside air through an orifice, the intake surface of which corresponds substantially to the active working surface of the blades of the fan, thereby presenting difficulties when the cab equipped with this type of equipment is to be pressurized. It was noted, in fact, that a flow of air of approximately 600 m3/h was indispensable to obtain suitable pressurisation of a tractor vehicle cab. If a flow of this magnitude is not reached, a certain amount of dust and polluting agents remains in the cab, and the occupant's safety is not guaranteed.

Another difficulty of this type of known equipment is the rapid clogging of the filter elements, and above all their rapid neutralisation when the machine works in an atmosphere laden with liquid particles (the spraying of aqueous solutions), in which case the surrounding mist formed as a result of spraying is sucked in by the motor-driven fan, passes through it, still laden with moisture and toxic products, and reaches the chemical filter which very quickly loses its absorbing capacity as soon as it is impregnated with moisture.

The object of the present invention is, consequently, to overcome these difficulties by providing pressurising and air purification equipment which has a more efficient pressurising function capable of preventing any penetration of polluted air into the cab.

Another object of the invention is to provide equipment which ensures more thorough purification and the effective period of which is increased, on the one hand, by delaying the clogging of the filter elements and on the other hand, by eliminating, before filtration, most of the liquid particles which may be contained in the outside atmosphere.

Yet another object is to provide such equipment with combined monitoring means which indicate at any moment the degree of effectiveness of the operation of the air pressuriser/conditioner which equips the work or driving cab. It is appropriate to recall that pressuriser equipment is provided with a prefilter, at least one physical filter and a chemical filter, the pressurising air being supplied by a variable-flow turbo fan which feeds forced air to the working cab.

It has transpired, in air pressuriser/conditioner equipment, that the filtering efficiency is governed by several factors, two of which are essential. These two factors are:

on the one hand, the relative pressure difference prevailing between the medium exterior to the cab and its interior medium. The exterior medium is the medium where a considerable degree of harmfulness prevails (spraying, dusting), the interior medium being the medium which it is intended to protect. This pressure difference is ensured by putting under pressure (or pressurising) the cab by means of the motor-driven fan of the equipment. The pressure difference may be slight, of the order of one to a few millimeters of head of water. This slight excess pressure will provide a barrier against the entry of harmful products inside the cab, on the other hand, the state of the filters (prefilter, physical filter and chemical filter). Three phenomena can affect the efficiency of filtration, namely:

clogging of the physical filters: the main function of the prefilter and the physical filter is to ensure physical retention of the particles suspended in the air. In fact, these particles are the prime carriers of the harmful vapours and products. It is therefore easy to understand that by performing their function these filters will become charged with particles and will progressively become clogged. Moreover, clogging gives rise to another effect; the filters, overloaded with particles, begin to release them, and these particles penetrate inside the cab. Filtering efficiency is then non-existent.

Saturation of the chemical filter: the property of the chemical filter consisting of activated charcoal and a support is to retain the organic constituents of the harmful vapours and aerosols by means of the absorption phenomenon. Nevertheless, the capacity for molecular weight retention of these chemical agents is limited and proportional to the weight of activated charcoal. The retention capacity of the cell is between 260 and 350 grms. Beyond that, the capacity drops quickly and chemical filtration becomes practically non-existent.

It is therefore important to know continuously, in the equipment of the type in question, the state of this chemical filter and the state of the mechanical filter or filters, but also to know and adjust the flow of air as a function of the filter capacity of the filters, whilst maintaining the minimum necessary pressurisation in the cab.

To achieve these objects, the invention relates, for this purpose, to an air pressuriser/conditioner for work cabs in a polluted atmosphere, especially the driving cabs of agricultural tractors, this equipment comprising an air treatment unit mounted or incorporated in the roof of a cab, this unit being equipped on the inside with at least one coarse filter element for eliminating the solids, such as tree leaves and grit, a fine filter element for dust removal, and an activated-charcoal cell for stopping the harmful gases and vapours by absorption, and finally a turbo-fan assembly for sucking in the outside air and for conveying it, filtered and purified, to the working cab, this air pressuriser/conditioner being characterised in that, on the one hand, the air treatment unit takes the form of a box, preferably the general form of a parallelepipedic box, which has, on one of its front faces a suction orifice extending over the greater part of this face to allow access to the front face of the coarse filter element and to the front face of the fine filter element, and in that, on the other hand, the turbo-fan assembly is located inside the box downstream of the filter elements, so that the air passes through the said filter elements as result of suction and is delivered purified into the working cab via a diffuser. The design of the equipment is such that the air flows are obliged to pass through the filters and that there can be no leak. In fact, in the suction/delivery direction, there is upstream the physical filter which is laid naturally, as result of suction of the air, against an intermediate leak-proof frame to which the chemical cell is attached downstream by means of two stays and a thrust mechanism. The filter and the cell have a sealing gasket on their face in contact with the intermediate leak-proof frame. In this way, the air sucked in from outside, once past the physical filter, is obliged to pass, without any possible leak, through the intermediate leak-proof frame and the cell where chemical treatment takes place. The air is then sucked in by the fan and delivered inside the cab, and further in that the pressuriser is equipped with a pressurisation monitoring device, a counter for the working of the chemical filter and a detector of the toxicity of the air forced into the cab.

By means of the pressurisation monitoring device, the occupant of a cab knows at any moment the state of pressurisation and consequently the state of clogging of the mechanical filters or abnormal pressure losses attributable to accidental leaks. By means of the counter for the working of the chemical filter, he knows its effective period. Finally, by means of the toxicity detector, he detects possible toxicity of the air forced into the cab. The user can, at any moment, as result of pressurisation monitoring in conjunction with the counter for the working of the chemical filter, select, as a function of the degree of exterior pollution, the most economical and most suitable air-flow speed to ensure the effective operation of the air pressuriser/conditioner.

According to another characteristic, the pressurisation indicator, the counter for the working of the chemical filter and the toxicity detector are preferably grouped in the cab on the diffuser of the air pressuriser/conditioner, whilst the toxicity detector takes the form of a card which can be plugged into a card-holder exposed to the air stream circulating in the diffuser of the air pressuriser/conditioner equipment, the said card preferably incorporating a pellet detecting the presence of insecticides containing phosphorus, a pellet detecting the presence of chlorinated insecticides and herbicides, a pellet detecting the presence of nitrated herbicides and a pellet detecting the presence of fungicides. Other types of pellet could supplement the present device.

Figure 2:
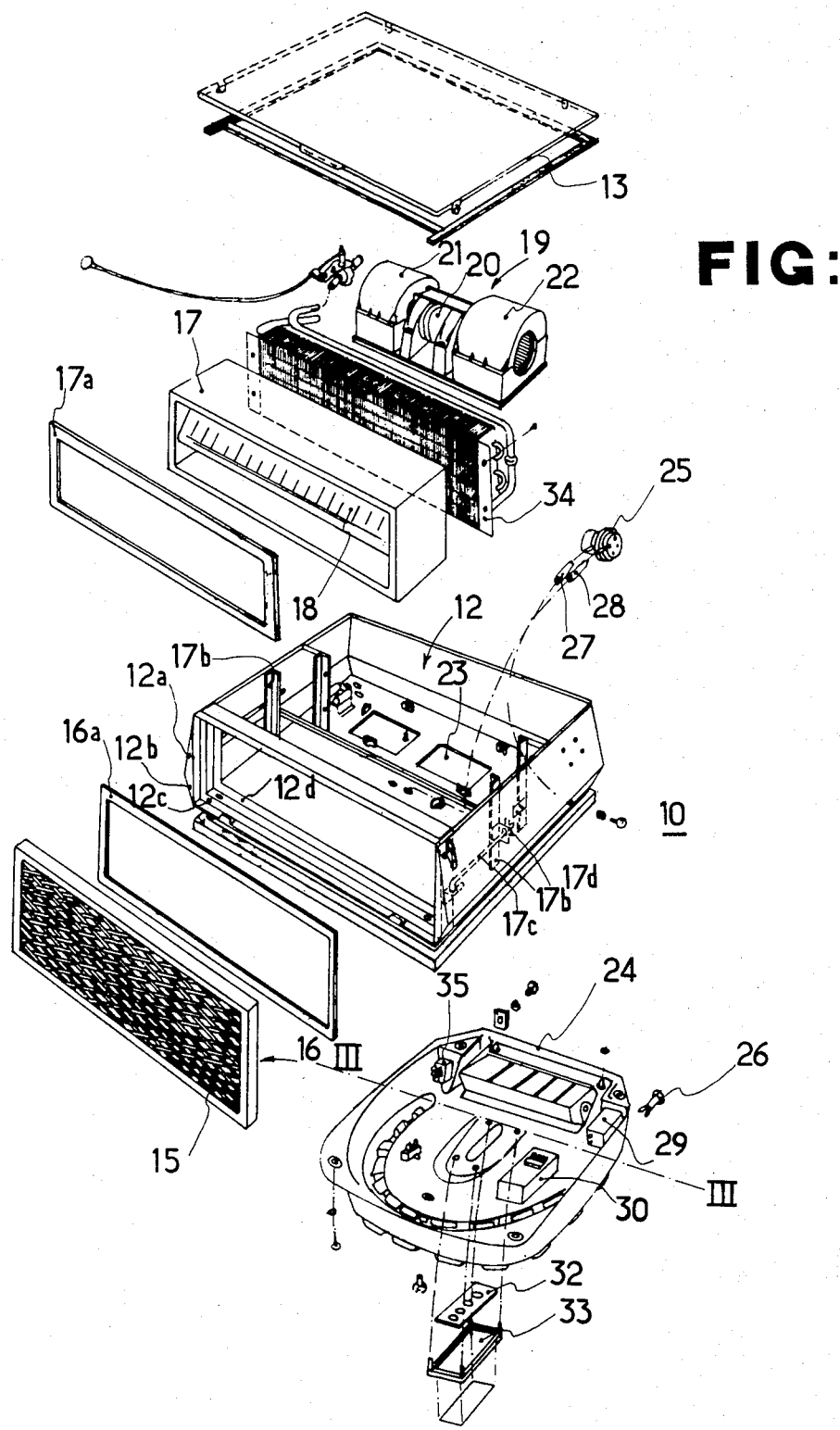

Other characteristics and advantages will also emerge from a reading of the following detailed description of an embodiment of the invention given here by way of example and shown in the attached drawings in which:

FIG. 1 is a diagrammatric view, in perspective, with parts cut away, showing the main elements forming the equipment, FIG. 2 is a more complete view of the equipment, showing the functional components in an exploded representation, FIG. 3 is a plan view of a toxicity detector, FIG. 4 is a cross-sectional view along the line 3—3 of FIG. 2, showing the toxicity detector in place on the air diffuser of the equipment, FIG. 5 is an electrical diagram of the monitoring device.

As shown in FIG. 1, the air pressuriser/conditioner is designated by the general reference numeral 10. In this example, the air treatment unit, or box 12, is provided with a removable cover 13 giving access to all the components of the equipment.

The treatment unit is located, here, on the roof of the cab 11 of a tractor vehicle. This roof is perforated with two orifices for the passage of the filtered air into the cab of the vehicle.

In a second version, this same unit can be supplied in the form of a plate to be integrated into the roof of the cab.

The air treatment unit takes the general form of a parallelepipedic box, one of the front faces of which has a suction orifice 10a which extends over the greater part of this face so as to allow access to the front face of a first coarse filter element 15 taking the form of a grille making it possible to eliminate the large particles which would clog the fine filter element 16 very quickly. The fine filter element 16 preferably consists of a special medium with fire-proofed synthetic fibres interlaced and fixed to one another by a fire-proof binder.

In a second version of the equipment and for the purpose of supplementing the anti-clogging action of the grille 15, there is, upstream of the front orifice of the filters 15, 16, a visor-shaped filter deflector 14 shielding the filter surfaces 15 and 16. The deflector 14 delimits, together with the front face of the suction orifice, a first chamber d1 for calming the air sucked in. It will be understood that by means of this arrangement the largest solid or liquid particles do not reach the grill plane 15.

According to one embodiment, the filter deflector 14 is made of sintered material, preferably metallic, having a porous structure. It was discovered surprisingly that the filter deflector made of sintered material provided considerable improvements to the filtering function. The deflector made of sintered material carries out the prefiltering function if it is located, as shown in the drawing, upstream of the dry filters 15 and 16. Under these conditions, the sintering density will be preferably between 50 and 200 microns, allowing for the air flow of the equipment which may reach 800 m3/h.

It goes without saying that a screen made of sintered material could also be located downstream of the dry filters 15, 16 so as to ensure fine filtering, in which case the sintering density can be of the order of 2 to 25 microns.

The consequence of the presence of the filter deflector 14 is also an improvement in the chemical treatment of the air. This improvement is attributable to the following two properties of the sintered material:

first of all, the sintered material of the filter deflector ensures the separation of any liquid suspended in a gas, such as, for example in vaporisation under liquid pressure. Water vapour in contact with the sintered material has a surface tension very different from that of the gas. The sintered material will be "wetted" by the water, whilst the gases will be able to pass through this barrier. The water will be collected or discharged on the front face of the deflector 14. The gases passing through the deflector will be treated all the better by the activated-charcoal filter cell, which will be described in more detail below, because these gases will be dry and not moist, since it has been observed that water vapour saturates activated charcoal very quickly.

Furthermore, the presence of the filter deflector 14 makes it possible to obtain selective separation of the gases. Contrary to nitrogen and oxygen which are constituents of air, the heavy gases (constituents which are chlorinated, halogenated, etc) which are encountered especially in pesticides have a considerable wetting capacity and will consequently be partly stopped by the sintered material. These heavy gases will be retained all the more by the sintered material because the latter has an affinity with such components.

Of course, it is possible to use sintered metallic materials, such as, for example, bronze, stainless steel, titanium, nickel, aliminium, etc.

According to another important arrangement of the invention the activated-charcoal air cleansing cell 17 takes the form of a removable case located downstream of the fine filter element 16 at a certain distance from this element, so as to form a second calming chamber designated by reference numeral d2. The case 17 contains a cellular bed 18 in which the activated charcoal is enclosed. The bed 18 is folded in two and fixed in the cell of the form of a V laid horizontally so as to present a narrow leading edge directed towards the fine filter element 16 and two diverging trailing edges directed towards the turbo-fan assembly 19. Between the activated-charcoal filter cell and the motor-driven fan assembly 19 there is a calming chamber d3, and this contributes to ensuring as lamina an air flow as possible over the entire length of travel covered by the treated air in the equipment.

According to another important arrangement of the invention, the turbo-fan assembly 19 is located inside the box 12 downstream of the various filter elements, so that the air to be filtered and purified passes successively as result of suction through the filter deflector 14, the coarse and fine filter elements 15, 16, the activated-charcoal cell 17, 18 and finally via the turbo-fan assembly 19 which feeds forced air directly into the working cab 11.

The turbo-fan assembly 19 consists of two blowing suction turbines 21, 22 with a horizontal axis of rotation. These turbines are driven by a common electric motor 20 located between the two turbine bodies. Each turbine body has two symmetrical air inflows located respectively at each end of the turbine body, the two turbine bodies 21, 22 being connected each time to a distributor collector 23, communicating with the working cab 11 via orifices provided for this purpose in the roof of the cab 11.

The equipment is completed by a treated-air diffuser 24 located in the cab 11 and fed by the turbo-fan assembly. This diffuser is shown in detail in FIG. 2.

In this type of equipment, it is important to ensure a very good seal between the various filters, to be certain that all the air to be filtered passes through the filter elements.

To obtain this seal, there is, at the entrance to the case 12, a first frame 12c opened to the front which receives the mechanical filters 15, 16 fitted in it with a sealing gasket 16a interposed.

Since the turbo-fan assembly 19 generates a vacuum on the rear face of the mechanical filter 16, there arises a bearing force on the said rear face of the filter, the gasket 16a and the frame 12c.

The seal between the activated-charcoal cell 17 is obtained in relation to a stationary bearing frame 12d, with a gasket 17a interposed, the cell gasket assembly being held clamped against the frame 12d by means of a pair of straps 17b, a pair of threaded stays 17c and clamping nuts 17d.

The mechanical and chemical filters can be completed by a heat exchanger 34, for example a heating radiator known per se.

A master switch 31 with three settings and switch-off allows control of the operation of the equipment according to any one of three air-flow speeds of the turbo-fan assembly.

Finally, according to a preferred embodiment, the side walls of the box are in the form of a convex deflector. This design solution makes it possible, on the one hand, to enlarge the volume of the air treatment box, and, on the other hand, to provide for each of these side walls a mechanical deflector, especially for tree branches which could be located in the path of the tractor vehicle. The sidewalls of the box are preferably formed from two converging planes, 12a, 12b joined at their vertex by a ridge which extends over the entire length of the said side walls.

With equipment of the type described, superpower ventilation which can supply 450 to 800 m3/h is obtained. At the nominal speed of 600 m3/h, the equipment makes it possible to renew the air in a cab of 3 m3 in less than 20 seconds, thus providing more than 3 renewals of air per minute.

It goes without saying that cabs provided with the pressuriser equipment will have to be sufficiently leak-proof to prevent a drop in the interior pressurisation. Advantageously, the turbo-fan has three ventilation speeds staged, for example, from 2,300 revolutions per minute to 3,700 revolutions per minute.

A method of unclogging the filters which can be used advantageously involves simply reversing the usual direction of the circulating flow which, in this case, is sucked into the cab and then forced through the bed of the cell 17 and through the dry filter 16. This unclogging method is especially advantageous because the particles retained both by the bed of the cell and by the dry filter no longer have to travel through the full thickness of these filters, but have only a short distance to cover to be rejected outside via the suction orifice.

In the embodiment in FIG. 2, the air pressuriser/conditioner 10 has a treated-air diffuser located in the cab and fed by the turbo-fan assembly 19. Grouped together on the diffuser 24 are the various instruments for monitoring the function of the air pressuriser/conditioner.

The monitoring device comprises, first of all, a differential pressure controller 25, the threshold of which is 3 mm head of water at locking and 2 mm head of water at release.

This means that it will be indispensable, at the start, to ensure pressurisation of at least 3 mm head of water in the working cab 11 for the pressure controller 25 to be released. In this case, the pressure controller 25 feeds an operational indicator 26 which, when illuminated, will be a sign of the presence of pressurisation of at least 2 mm head of water in the working cab. The differential pressure intake takes place, on the one hand, via a pipe 27, the orifice of which opens on the outside of the case 12 of the air pressuriser/conditioner equipment, and, on the other hand, via a pipe 28, the orifice of which opens into the working cab. By means of this first arrangement, it is possible to record pressurisation failures in the cab. These failures may be attributable either to the clogging of the filters, 15, 17, which results in an insufficiency of air flow, in which case it is enough to clean the physical filters and, if appropriate, exchange the chemical filter, or the lead-proof seal of the cab is faulty, in which case it will be sufficient to improve its leak-proofing.

The device also has a pulse counter 29 making it possible to check the volume of air delivered by the equipment.

The counter 29 is a pulse counter, the time base of which is provided by a coil or a quartz crystal. Associated with this counter is an electronic divider 30 shown, in the example, with three ratios corresponding to the three settings of the selector switch 31 of the turbo-fan 19.

The airflows corresponding to the 3 ventilation speeds were recorded so as to give the divider bridge 30 the air-flow ratios.

The table below indicates a preferred choice of the ratios used:

| Speed e | Average air flow | Ratio of the divider |
|---|---|---|
| 1 | 210 m³/h | 1 |
| 2 | 140 m³/h | 0.7 |
| 3 | 100 m³/h | 0.5 |

During endurance tests on the air pressuriser/conditioner, the time or the toxicity threshold was recorded. Since the times for the three speeds of the turbo-fan 19 are known, the divider bridge 30 makes it possible to display on the counter 29 a time corrected as a function of the flow speeds of the turbo-fan. This device enables the state of the activated-charcoal cell 17 to be known at any moment.

The counter for the working time of the chemical filter cell and the cab pressurisation indicator are advantageously supplemented by a toxicity detector 32 taking the form of a card which can be plugged into a cardholder 33 exposed to the airstream circulating in the diffuser 24 of the air pressuriser/conditioner equipment. The plug-in card 32 incorporates reagent pellets A, B, C, D respectively, which react by a change of colour to all the products used for crop treatment (FIGS. 3 and 4).

The toxicity detector proved especially useful because in some cases, for various reasons, the degree of toxicity may be exceeded in the cab without the maintenance times of the filters being reached for all that. There are many such reasons, and the following may be mentioned by way of example:
an error in the dosage of the treatment carried out, difficult atmospheric conditions,
an accident in the cab (pressurisation not ensured).
In all these cases, the toxicity level can therefore be reached in the cab without the occupant, for all that, realising this.

The function of the toxicity detector is therefore to indicate when the standardised threshold, especially the OSHA standards, are exceeded.

The table below summarises the products to which these pellets react:

| Pellet | Reagent | Rate | Pesticide |
|---|---|---|---|
| A | Ammonia | 25 ppm | Insecticides containing phosphorus |
| B | Chlorine | 1 ppm | Insecticides and herbicides |
| C | Hydracid | 1 ppm | Nitrated |

-continued

| Pellet | Reagent | Rate | Pesticide |
|---|---|---|---|
| D | Hydrogen Sulphide | 5 ppm | herbicides Fungicides |

The device detects continuously. The pellet will start to change colour as soon as the toxicity rate in the table is reached. This colour will become more pronounced and will turn dark if no measurement is made. In the example chosen, it was necessary to provide four pellets, because although one of these is sensitive to the reactive product chosen, it is nevertheless insensitive to the nature of any other product. For example, a pellet, the reagent of which is chlorine, will not change colour if ammonia passes over it. The detector carries on the card 32 the original colour (neutral) and the colour which the latter will turn when subjected to the reagent. These indications make it possible to render visible at any moment the start of a change of colour which is sometimes difficult to determine.

The colour code is as follows:

| Pellet | Original Colour | Colour at the toxicity threshold |
|---|---|---|
| A | yellow | blue |
| B | white | yellow |
| C | white | yellow |
| D | white | brown |

The card 32 or strip will be exchanged as soon as one of the pellets has changed colour.

Of course, the invention is not limited to the exemplary embodiments described and illustrated above, in which other alternative forms can be provided without thereby departing from the scope of the attached claims.

I claim:

1. Air pressurizer/conditioner for work cabs in a polluted atmosphere, especially the driving cabs of agricultural tractors, this equipment comprising an air treatment unit mounted or built into the roof of a cab, this unit being equipped on the inside with at least one coarsefilter element for eliminating the solids, such as tree leaves and grit, a fine filter element, for dust removal and an activated-charcoal cell for stopping the harmful gases and vapours by absorption, and finally a turbo-fan assembly for sucking in the outside air and conveying it, filtered and purified, to the working cab, this air pressurizer/conditioner being characterized in that, on the one hand, the air treatment unit takes the form of a box, preferably the general form of a parallelepipedic box, which has, on one of its front faces a suction orifice extending over the greater part of this face to allow access to the front face of the coarse filter element and to the front face of the fine filter element, these said faces being attached mechanically and without a leak to an intermediate leakproof frame, in that, on the other hand, the turbo-fan assembly is located inside the box downstream of the filter elements so that the air passes through the said filter elements as a result of suction and is delivered purified into the working cab through a diffuser, and further in that the pressurizer is provided with a pressurization monitoring device and a toxicity detector for the air forced into the cab, characterized in that the pressurization and toxicity monitoring device comprises, on the one hand, a differential pressure controller having a pressure intake in the cab and a pressure intake outside the cab, this pressure controller feeding a pressurization indicator in the cab, and, on the other hand, a pulse counter associated with a divider bridge having as many ratios as the turbo-fan assembly has flow speeds, this counter displaying, in corrected time, the effective working time of the chemical filter as a function of the flow speeds of the turbo-fan, and further a toxicity detector incorporating, on a replaceable support located in the path of the air forced into the cab, several reagent pellets which by a change of colour reveal, from a certain threshold, the presence of polluting chemical bodies.

2. Air pressuriser/conditioner according to claim 1 characterised in that, on the one hand, there is, upstream of the front orifice for the air inflow, a filter deflector separating the liquids suspended in a gas, this deflector delimiting together with the front face of the first filter a first chamber for calming the air sucked in, in that, on the other hand, the activated-charcoal cleansing cell is located at a certain distance from the fine/filter element to form a second calming chamber, and further in that the turbo-fan assembly is likewise located at a certain distance from the cleasning cell to form a third calming chamber.

3. Air pressuriser/condition according to claim 1 characterised in that the activated-charcoal cleansing cell takes the form of a removable case, this case containing a cellular bed in which the activated charcoal is enclosed, this bed taking the form of a V laid horizontally so as to present a narrow leading edge directed towards the fine filter element and two diverging trailing edges directed towards the turbo-fan assembly.

4. Air pressuriser/conditioner according to claim 1 characterised in that the pressurisation indicator the counter for the working of the chemical filter, and the toxicity detector are preferably grouped in the cab on the diffuser of the air pressuriser/conditioner, and in that the pressure controller is coupled to a selector switch controlling the various flow speeds of the turbo-fan.

5. Pressuriser according to claim 1, characterised in that the side walls of the air treatment box are in the shape of a convex deflector preferably formed from two converging planes joined at their vertex by a ridge.

6. Air pressuriser/conditioner according to anyone of claims 2 to 4, and 5, characterised in that the toxicity detector takes the form of a card which can be plugged into a card-holder exposed to the air stream circulating in the diffuser of the air pressuriser/conditioner equipment, the said card preferably incorporating an ammonia pellet detecting the presence of insecticides containing phosphorus, a chlorine pellet detecting the presence of chlorinated insecticides and herbicides, a hydracid pellet detecting the presence of nitrated herbicides and a hydrogen sulphide pellet detecting the presence of fungicides.

* * * * *